United States Patent
Beisel

(10) Patent No.: US 10,876,941 B2
(45) Date of Patent: Dec. 29, 2020

(54) DETERMINING FLUID DENSITY IN A PRESSURE PUMP USING BULK MODULUS MEASUREMENTS

(71) Applicant: Halliburton Energy Services, Inc., Houston, TX (US)

(72) Inventor: Joseph Beisel, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 121 days.

(21) Appl. No.: 16/310,131

(22) PCT Filed: Aug. 31, 2016

(86) PCT No.: PCT/US2016/049600
§ 371 (c)(1),
(2) Date: Dec. 14, 2018

(87) PCT Pub. No.: WO2018/044288
PCT Pub. Date: Mar. 8, 2018

(65) Prior Publication Data
US 2019/0187032 A1    Jun. 20, 2019

(51) Int. Cl.
*G01N 3/12* (2006.01)
*G01N 9/32* (2006.01)
*G01N 9/00* (2006.01)

(52) U.S. Cl.
CPC .............. *G01N 3/12* (2013.01); *G01N 9/00* (2013.01); *G01N 9/32* (2013.01); *G01N 2203/0048* (2013.01)

(58) Field of Classification Search
CPC ............... G01N 3/12; G01N 9/00; G01N 9/32

USPC ............................................................ 73/37
See application file for complete search history.

(56) References Cited

U.S. PATENT DOCUMENTS

| | | | |
|---|---|---|---|
| 5,741,962 A | 4/1998 | Birchak et al. | |
| 5,755,559 A | 5/1998 | Allington et al. | |
| 6,874,361 B1* | 4/2005 | Meltz | E21B 43/14 73/152.32 |
| 6,882,960 B2 | 4/2005 | Miller | |
| 7,623,986 B2 | 11/2009 | Miller | |
| 2001/0032612 A1 | 10/2001 | Welch et al. | |
| 2007/0022803 A1* | 2/2007 | DiFoggio | G01N 29/024 73/64.53 |

(Continued)

FOREIGN PATENT DOCUMENTS

WO     2009086279     7/2009

OTHER PUBLICATIONS

International Patent Application No. PCT/US2016/049600, "International Search Report and Written Opinion", dated May 26, 2017, 17 pages.

*Primary Examiner* — John Fitzgerald
*Assistant Examiner* — Rodney T Frank
(74) *Attorney, Agent, or Firm* — Kilpatrick Townsend & Stockton LLP

(57) ABSTRACT

A system may include a strain gauge and a pulse detection system positionable on a fluid end of a pressure pump. The strain gauge may generate a strain signal representing strain in the chamber. The pulse detection system may include a pulse generator and a pulse detector for generating timing signals that are useable to determine a travel time of a corresponding pulse generated by the pulse generator. The strain signal and the timing signals may be useable to determine a density of the fluid in the pressure pump.

20 Claims, 11 Drawing Sheets

(56) References Cited

U.S. PATENT DOCUMENTS

2015/0082862 A1    3/2015  Kersey et al.
2018/0223644 A1*   8/2018  Beisel .................. E21B 47/009

* cited by examiner

DETERMINING FLUID DENSITY IN A PRESSURE PUMP USING BULK MODULUS MEASUREMENTS

TECHNICAL FIELD

The present disclosure relates generally to pressure pumps for a wellbore and, more particularly (although not necessarily exclusively), to systems for determining fluid density of pressure pump slurries using bulk modulus measurements.

BACKGROUND

Pressure pumps may be used in wellbore treatments. For example, hydraulic fracturing (also known as "fracking" or "hydro-fracking") may utilize a pressure pump to introduce or inject fluid at high pressures into a wellbore to create cracks or fractures in downhole rock formations. A bulk modulus of the fluid flowing through the pressure pump and introduced into the wellbore provide information with respect to the macroscopic properties of the fluid for predicting accurate displacements or combining with other measurements to extract additional information useful for pumping operations.

DETAILED DESCRIPTION

Figure 1A:
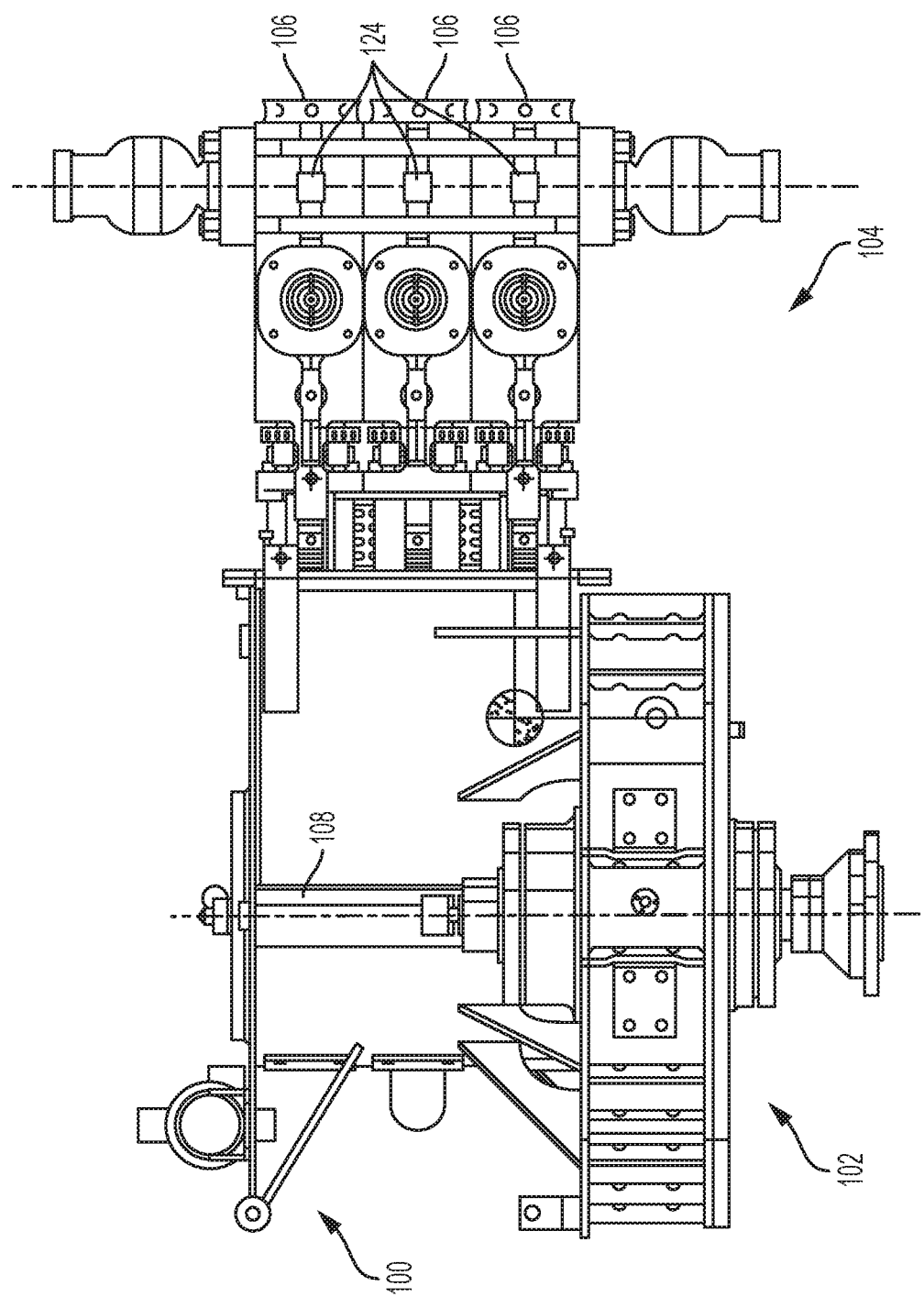
FIG. 1A is a cross-sectional, top view schematic diagram depicting an example of a pressure pump that may include a measurement system according to one aspect of the present disclosure.

Certain aspects and examples of the present disclosure relate to a measurement system for determining the density of fluid in a fluid system of a pressure pump using a bulk modulus of the fluid system and a speed of sound through the fluid system. The bulk modulus of the fluid system may include the resistance of the fluid in the fluid system to uniform compression. The reciprocal of the bulk modulus may provide the fluid's compressibility, which is the measure of the relative volume change of the fluid in response to a change in pressure. The speed of sound may be determined using a pulse generator and a pulse detector to transmit and detect a pressure pulse in the fluid to identify a speed of the pulse that corresponds to the speed of sound. The density of the fluid system may be determined by dividing the bulk modulus by a square of the speed of sound.

A measurement system according to some aspects may determine the bulk modulus of the fluid system of the pressure pump when fluid is isolated in a chamber of the pressure pump. For example, fluid may be isolated in the chamber during an amount of time where both a suction valve and a discharge valve of the chamber are in a closed position. As a plunger continues to move within the chamber during this amount of time, the strain may change in the chamber to allow the measurement system to determine the bulk modulus. Actuation points for the valves of the chamber may be determined from a strain signal generated by a strain gauge positioned on a fluid end of the pressure pump. The actuation points may correspond to the times when one valve (e.g., the suction valve) of the chamber closes and a second valve (e.g., the discharge valve) opens. The time between the actuation points may correspond to the time that both the suction valve and the discharge valve are closed to isolate fluid in the chamber.

Radioactive sources, such as x-rays or gamma rays, are currently used to determine the density of the fluid system of a pressure pump. But, the radioactive sources may be hazardous to individuals exposed to the radioactive sources in the pumping environment. Further, using radioactive sources in pumping environments may require obtaining specialized permits, tracking the use of the radioactive sources, and inspection of components exposed to the radioactive sources that may significantly slow down pumping operations. A measurement system according to some aspects may allow density of the fluid to be determined without the use of radioactive sources, resulting in savings of both time and cost.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1B:
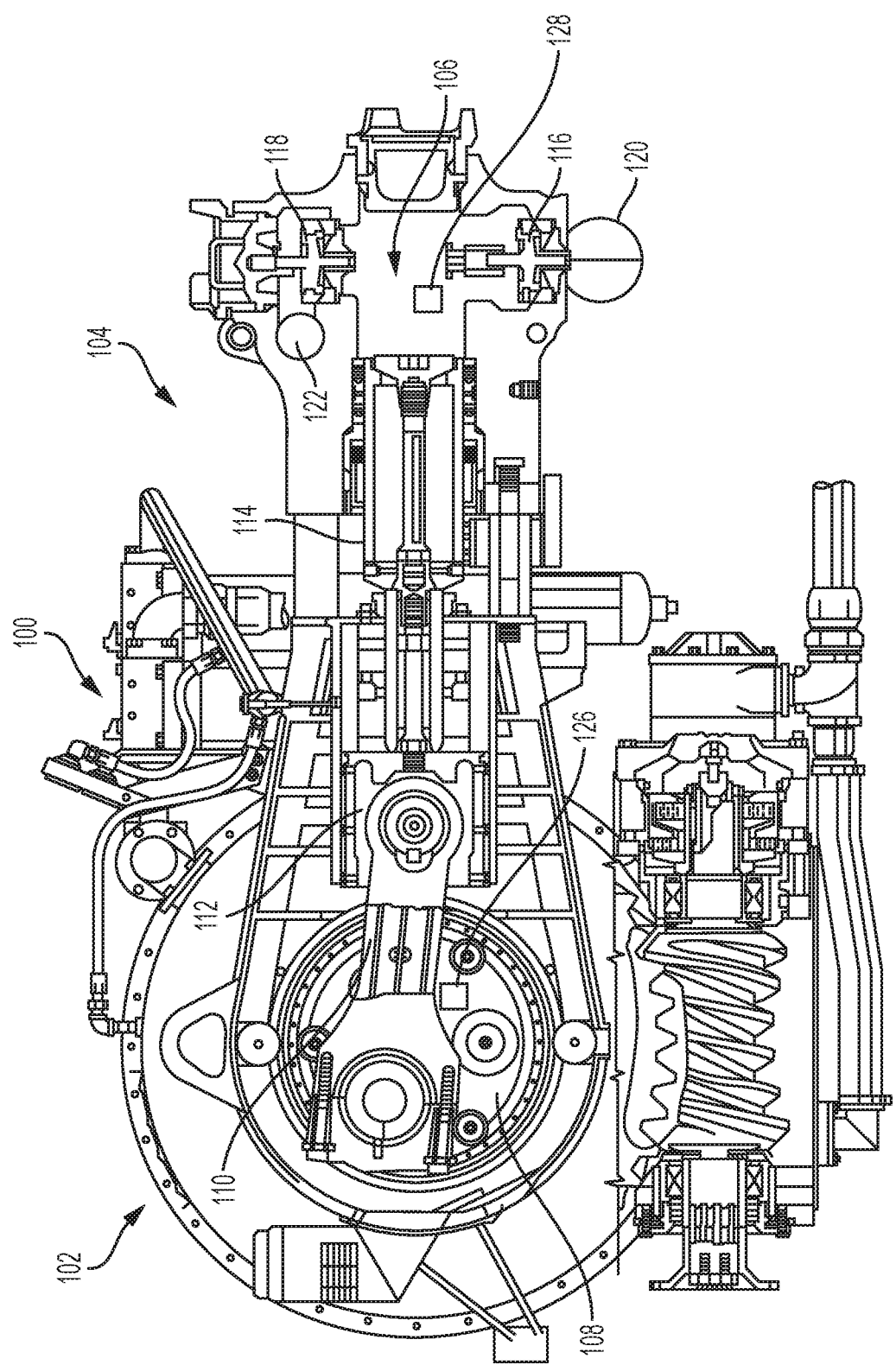
FIG. 1B is a cross-sectional, side view schematic diagram depicting the pressure pump of FIG. 1A according to one aspect of the present disclosure.

FIGS. 1A and 1B show a pressure pump 100 that may utilize a measurement system according to some aspects of the present disclosure. The pressure pump 100 may be any positive displacement pressure pump. The pressure pump 100 may include a power end 102 and a fluid end 104. The power end 102 may be coupled to a motor, engine, or other prime mover for operation. The fluid end 104 includes chambers 106 for receiving and discharging fluid flowing through the pressure pump 100. Although FIG. 1A shows three chambers 106 in the pressure pump 100, the pressure pump 100 may include any number of chambers 106, including one, without departing from the scope of the present disclosure.

The pressure pump 100 may also include a rotating assembly. The rotating assembly may include a crankshaft 108, one or more connecting rods 110, a crosshead 112, plungers 114, and related elements (e.g., pony rods, clamps, etc.). The crankshaft 108 may be positioned in the power end 102 of the pressure pump 100 and may be mechanically connected to a plunger 114 in a chamber 106 of the pressure pump via the connecting rods 110 and the crosshead 112. The crankshaft 108 may cause a plunger 114 located in a chamber 106 to displace any fluid in the chamber 106. In some aspects, each chamber 106 of the pressure pump 100 may include a separate plunger 114, each plunger 114 in each chamber 106 mechanically connected to the crankshaft 108 via the connecting rod 110 and the crosshead 112. Each chamber 106 may include a suction valve 116 and a discharge valve 118 for absorbing fluid into the chamber 106 and discharging fluid from the chamber 106, respectively. The fluid may be absorbed into and discharged from the chamber 106 in response to a movement of the plunger 114 in the chamber 106. Based on the mechanical coupling of the crankshaft 108 to the plunger 114 in the chamber 106, the movement of the plunger 114 may be directly related to the movement of the crankshaft 108.

A suction valve 116 and a discharge valve 118 may be included in each chamber 106 of the pressure pump 100. In some aspects, the suction valve 116 and the discharge valve 118 may be passive valves. As the plunger 114 operates in the chamber 106, the plunger 114 may impart motion and pressure to the fluid by direct displacement. The suction valve 116 and the discharge valve 118 may open and close based on the displacement of the fluid in the chamber 106 by the plunger 114. For example, the suction valve 116 may be opened during when the plunger 114 recesses to absorb fluid from outside of the chamber 106 into the chamber 106. As the plunger 114 is withdrawn from the chamber 106, it may create a differential pressure to open the suction valve 116 and allow fluid to enter the chamber 106. In some aspects, the fluid may be absorbed into the chamber 106 from an inlet manifold 120. Fluid already in the chamber 106 may move to fill the space where the plunger 114 was located in the chamber 106. The discharge valve 118 may be closed during this process.

The discharge valve 118 may be opened as the plunger 114 moves forward, or reenters, the chamber 106. As the plunger 114 moves further into the chamber 106, the fluid may be pressurized. The suction valve 116 may be closed during this time to allow the pressure on the fluid to force the discharge valve 118 to open and discharge fluid from the chamber 106. In some aspects, the discharge valve 118 may discharge the fluid into a discharge manifold 122. The loss of pressure inside the chamber 106 may allow the discharge valve 118 to close and the cycle may restart. Together, the suction valve 116 and the discharge valve 118 may operate to provide the fluid flow in a desired direction. The process may include a measurable amount of pressure and stress in the chamber 106, such as the stress resulting in strain to the chamber 106 or fluid end 104 of the pressure pump 100. In some aspects, a measurement system may be coupled to the pressure pump 100 to measure the strain and determine a condition of the suction valve 116 and the discharge valve 118 in the chamber 106.

In some aspects, a measurement system may be coupled to the pressure pump 100 to measure the strain and determine actuation of the suction valve 116 and the discharge valve 118 in the chamber 106. For example, a measurement system may include one or more strain gauges, one or more position sensors, and a pulse detection system. The strain gauges positioned on an external surface of the fluid end 104 to measure strain in the chambers 106. Strain gauge 124 in FIG. 1A show an example of a placement for the strain gauges that may be included in the measurement system. In some aspects, the measurement system may include a separate strain gauge to monitor strain in each chamber 106 of the pressure pump 100. The position sensors may be positioned on the power end 102 of the pressure pump 100 to sense the position of the crankshaft 108 or another rotating component of the pressure pump 100. Position sensor 126 shows an example of a placement of a position sensor on an external surface of the power end 102 to sense the position of the crankshaft 108. Measurements of the crankshaft position may allow the measurement system to determine the position of the plungers 114 in the respective chambers The pulse detection system may include a pulse generator for generating a pulse and transmitting the pulse through fluid in the pressure pump 100. The pulse detection system may also include a pulse detector positioned to sense or detect the pulse generated by the pulse generator. The pulse detection system may be used to determine the speed that a pulse may be transmitted through the fluid. In some aspects, the pulse may be transmitted through the fluid in the pressure pump 100. For example, the pulse detection system may be positioned in the fluid end 104 of the pressure pump 100 to allow the pulse to be transmitted through the fluid in the pressure pump 100. System 128 shows an example of a placement of a pulse detection system positioned in the chamber 106 of the pressure pump to transmit and detect a pulse traversing the fluid in the chamber 106. In additional and alternative aspects, the pulse may be transmitted through fluid entering or exiting the pressure pump 100.

Figure 2:
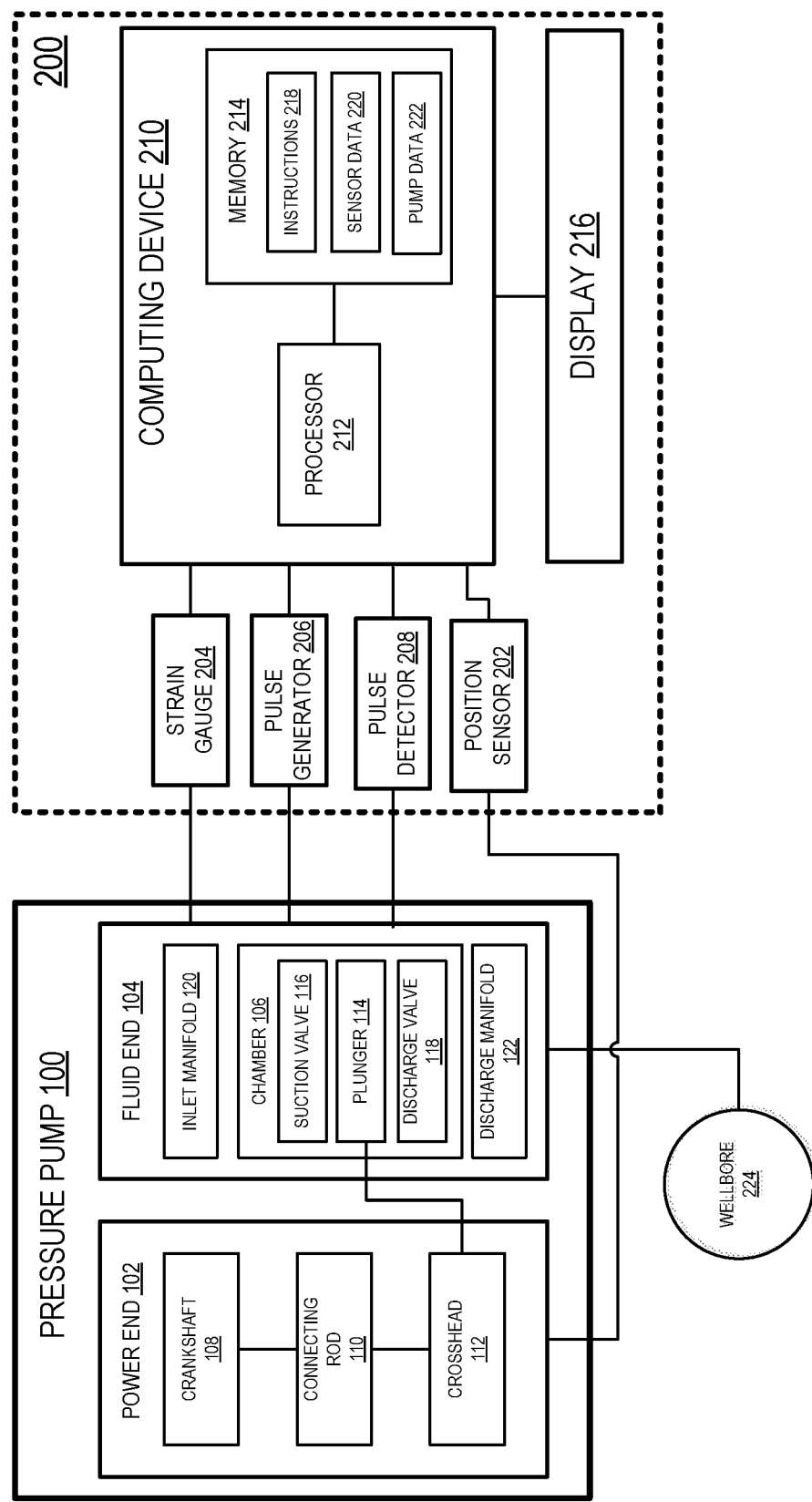
FIG. 2 is a block diagram depicting a measurement system for a pressure pump according to one aspect of the present disclosure.

FIG. 2 is a simple block diagram showing an example of a measurement system 200 coupled to the pressure pump 100 according to one example. The measurement system 200 may include a position sensor 202, a strain gauge 204, a pulse generator 206, a pulse detector 208, and a computing device 210. In some aspects, the computing device 210 may be communicatively coupled to the pressure pump 100 through the position sensor 202, the strain gauge 204, the pulse generator 206, and the pulse detector 208. The position sensor 202 may include a single sensor or may represent an array of sensors. The position sensor 202 may be a magnetic pickup sensor capable of detecting ferrous metals in close proximity. The position sensor 202 may be positioned on the power end 102 of the pressure pump 100 for determining the position of the crankshaft 108. In some aspects, the position sensor 202 may be placed proximate to a path of the crosshead 112. The path of the crosshead 112 may be directly related to a rotation of the crankshaft 108. The position sensor 202 may sense the position of the crankshaft 108 based on the movement of the crosshead 112. In other aspects, the position sensor 202 may be placed directly on a crankcase of the power end 102 as illustrated by position sensor in FIG. 1A. The position sensor 202 may determine a position of the crankshaft 108 by detecting a bolt pattern of the crankshaft 108 as the crankshaft 108 rotates during operation of the pressure pump 100. In each aspect, the position sensor 202 may generate a signal representing the position of the crankshaft 108 and transmit the signal to the computing device 210.

The strain gauge 204 may be positioned on the fluid end 104 of the pressure pump 100. The strain gauge 204 may include a single gauge or an array of gauges for determining strain in the chamber 106. Non-limiting examples of types of strain gauges include electrical resistance strain gauges, semiconductor strain gauges, fiber optic strain gauges, micro-scale strain gauges, capacitive strain gauges, vibrating wire strain gauges, etc. In some aspects, the measurement system 200 may include a strain gauge 204 for each chamber 106 of the pressure pump 100 to determine strain in each of the chambers 106, respectively. In some aspects, the strain gauge 204 may be positioned on an external surface of the fluid end 104 of the pressure pump 100 in a position subject to strain in response to stress in the chamber 106. For example, the strain gauge 204 may be positioned on a section of the fluid end 104 in a manner such that when the chamber 106 loads up, strain may be present at the location of the strain gauge 204. This location may be determined based on engineering estimations, finite element analysis, or by some other analysis. For example, finite element analysis may determine that strain in the chamber 106 may be directly over a plunger bore of the chamber 106 during load up. The strain gauge 204 may be placed on an external surface of the pressure pump 100 in a location directly over the plunger bore corresponding to the chamber 106 as illustrated by strain gauge 124 in FIG. 1A to measure strain in the chamber 106. The strain gauge 204 may generate a signal representing strain in the chamber 106 and transmit the signal to the computing device 210.

The pulse generator 206 and the pulse detector 208 may be positioned on the fluid end 104 of the pressure pump 100. The measurement system 200 may include a pulse detection system for the pressure pump 100 to determine a speed of a pulse through fluid in the pressure pump 100. In some aspects, the pulse generator 206 and the pulse detector 208 may each include multiple pulse generators 206 and pulse detectors 208. The pulse generated by the pulse generator 206 may include a pressure pulse. For example, the pulse may correspond to an acoustic sound generated by the pulse generator 206 and creating a pressure in the fluid of the pressure pump 100. In some aspects, the pulse generator 206 and the pulse detector 208 may be positioned a known distance apart. The pulse generator 206 may generate a pulse and transmit the pulse through the fluid in the pressure pump 100. The pulse detector 208 may sense the pulse once the pulse travels through the fluid to the pulse detector 208. The time the pulse was generated by the pulse generator 206 and the time the pulse was received by the pulse detector 208 may be transmitted to the computing device 210. In some aspects, the pulse generator 206 and the pulse detector 208 may generate timing signals representing the time that the pulse was generated and detected, respectively.

The computing device 210 may be coupled to the position sensor 202, the strain gauge 204, the pulse generator 206, and the pulse detector 208 to receive the respective signals from each. The computing device 210 includes a processor 212, a memory 214, and a display unit 216. In some aspects, the processor 212, the memory 214, and the display unit 216 may be communicatively coupled by a bus. The processor 212 may execute instructions 218 for determining a fluid density or other parameters in the pressure pump 100. The instructions 218 may be stored in the memory 214 coupled to the processor 212 by the bus to allow the processor 212 to perform the operations. The processor 212 may include one processing device or multiple processing devices. Non-limiting examples of the processor 212 may include a Field-Programmable Gate Array ("FPGA"), an application-specific integrated circuit ("ASIC"), a microprocessor, etc. The non-volatile memory 214 may include any type of memory device that retains stored information when powered off. Non-limiting examples of the memory 214 may include electrically erasable and programmable read-only memory ("EEPROM"), a flash memory, or any other type of non-volatile memory. In some examples, at least some of the memory 214 may include a medium from which the processor 212 can read the instructions 218. A computer-readable medium may include electronic, optical, magnetic, or other storage devices capable of providing the processor 212 with computer-readable instructions or other program code (e.g., instructions 218). Non-limiting examples of a computer-readable medium include (but are not limited to) magnetic disks(s), memory chip(s), ROM, random-access memory ("RAM"), an ASIC, a configured processor, optical storage, or any other medium from which a computer processor can read the instructions 218. The instructions 218 may include processor-specific instructions generated by a compiler or an interpreter from code written in any suitable computer-programming language, including, for example, C, C++, C #, etc.

In some examples, the computing device 210 may determine an input for the instructions 218 based on sensor data 220 from the position sensor 202, the strain gauge 204, the pulse generator 206, the pulse detector 208, data input into the computing device 210 by an operator, or other input means. For example, the position sensor 202 or the strain gauge 204 may measure a parameter (e.g., the position of the crankshaft 108, strain in the chamber 106) associated with the pressure pump 100 and transmit associated signals to the computing device 210. The computing device 210 may receive the signals, extract data from the signals, and store the sensor data 220 in memory 214. In another example, the pulse generator 206 or the pulse detector 208 may generate a timing signal corresponding to the time that a pulse is generated or detected, respectively, and transmit the timing signal to the computing device 210. In additional aspects, the computing device 210 may determine an input for the instructions 218 based on pump data 222 stored in the memory 214.

In some aspects, the pump data 222 may be stored in the memory 214 in response to previous determinations by the computing device 210. For example, the processor 212 may execute instructions 218 for fluid density and may store the determinations, and intermediate determinations (e.g., internal pressure determinations, bulk modulus of the fluid system) as pump data 222 in the memory 214 for further use in pumping and monitoring operations (e.g., calibrating the pressure pump, determining conditions in the pressure pump, comparing changes in bulk modulus or fluid density, determining expected valve actuation delays, etc.). In additional aspects, the pump data 222 may include other known information, including, but not limited to, the position of the position sensor 202, the strain gauge 204, the pulse generator 206, or the pulse detector 208 in or on the pressure pump 100. For example, the computing device 210 may use the position of the position sensor 202 on the power end 102 of the pressure pump 100 to interpret the position signals received from the position sensor 202 (e.g., as a bolt pattern signal). In another example, the computing device 210 may use the position of the pulse generator 206 and the pulse detector 208 to calculate a travel distance by the pulse from the pulse generator 206 to the pulse detector 208.

In some aspects, the computing device 210 may generate graphical interfaces associated with the sensor data 220 or pump data 222, and information generated by the processor 212 therefrom, to be displayed via a display unit 216. The display unit 216 may be coupled to the processor 212 and may include any CRT, LCD, OLED, or other device for displaying interfaces generated by the processor 212. In some aspects, the computing device 210 may also generate an alert or other communication of the performance of the pressure pump 100 based on determinations by the computing device 210 in addition to, or instead of, the graphical interfaces. For example, the display unit 216 may include audio components to emit an audible signal when a condition is present in the pressure pump 100.

In some aspects, in addition to the measurement system 200, the pressure pump 100 may also be coupled to (e.g., in fluid communication with) a wellbore 224. For example, the pressure pump 100 may be used in hydraulic fracturing to inject fluid into the wellbore 224. Subsequent to the fluid passing through the chambers 106 of the pressure pump 100, the fluid may be injected into the wellbore 224 at a high pressure to break apart or otherwise fracture rocks and other formations in the wellbore 224 to release hydrocarbons. The measurement system 200 may monitor the suction valve 116 and the discharge valve 118 to determine when to halt the fracturing process for maintenance of the pressure pump 100. Although hydraulic fracturing is described here, the pressure pump 100 may be used for any process or environment requiring a positive displacement pressure pump.

Figure 3:
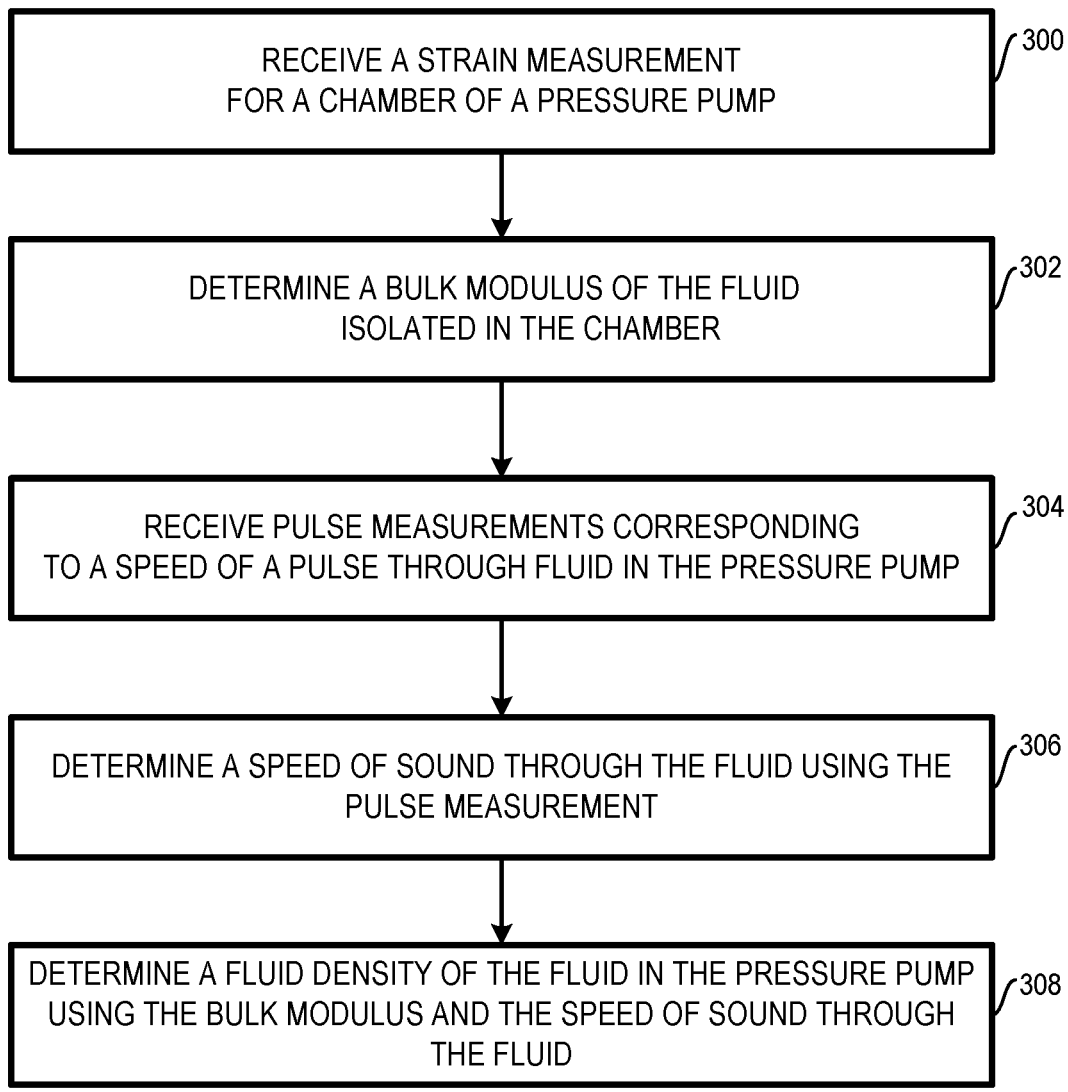
FIG. 3 is a flowchart describing an example of a process for determining a density of a fluid system of the pressure pump according to one aspect of the present disclosure.

FIG. 3 is a flowchart showing a process for determining a density of the fluid system in the pressure pump 100 according to some aspects of the present disclosure. The process is described with respect to the measurement system 200 shown in FIG. 2, although other implementations are possible without departing from the scope of the present disclosure.

In block 300, the computing device 210 receives a strain measurement for at least one chamber 106 of the pressure pump 100. In some aspects, the strain measurement may include one or more strain signals generated by a strain gauge positioned in the fluid end 104 of the pressure pump 100. In some aspects, the strain gauge and positioned on an external surface of the fluid end 104.

Figure 4:
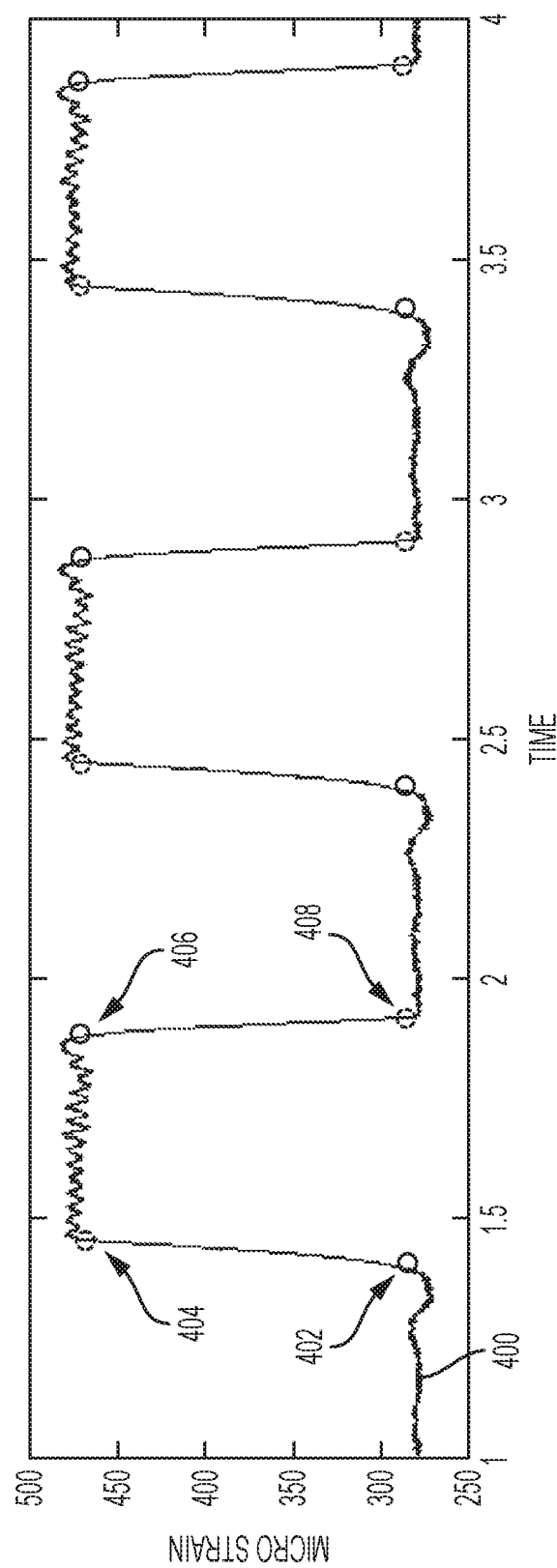
FIG. 4 is a signal graph depicting a signal generated by a strain gauge of the measurement system of FIG. 2 according to one aspect of the present disclosure.

FIG. 4 shows a raw strain signal 400 generated by the strain gauge 204 coupled to the fluid end 104 of the pressure pump 100. In some aspects, the computing device 210 may determine actuation points 402, 404, 406, 408 of the suction valve 116 and the discharge valve 118 for the chamber 106 based on the strain signal 400. The actuation points 402, 404, 406, 408 may represent the point in time where the suction valve 116 and the discharge valve 118 open and close. The computing device 210 may execute the instructions 218 stored in the memory 214 to determine the actuation points 402, 404, 406, 408. For example, the computing device 210 may execute instructions 218 to determine the actuation points 402, 404, 406, 408 by determining discontinuities in the strain signal 400. The stress in the chamber 106 may change during the operation of the suction valve 116 and the discharge valve 118 to cause the discontinuities in the strain signal 400 during actuation of the valves 116, 118 and the computing device 210 may identify the discontinuities as the opening and closing of the valves 116, 118.

In one example, the strain in the chamber 106 may be isolated to the fluid in the chamber 106 when the suction valve 116 is closed. The isolation of the strain may cause the strain in the chamber 106 to load up until the discharge valve 118 is opened. When the discharge valve 118 is opened, the strain may level until the discharge valve 118 is closed, at which point the strain may unload until the suction valve 116 is reopened. The discontinuities may be present when the strain signal 400 shows a sudden increase or decrease in value corresponding to the actuation of the valves 116, 118. In FIG. 4, actuation point 402 represents the suction valve 116 closing, actuation point 404 represents the discharge valve 118 opening, actuation point 406 represents the discharge valve 118 closing, and actuation point 408 represents the suction valve 116 opening to resume the cycle of fluid into and out of the chamber 106. The computing device 210 may determine the actuation points 402, 404, 406, 408 based on the strain signal 400 providing a characterization of the loading and unloading of the strain in the chamber 106.

Returning to FIG. 3, in block 302, the computing device 210 determines a bulk modulus of the fluid when the fluid is isolated in the chamber 106. In some aspects, the bulk modulus may be determined using measurements of the pressure in the chamber 106 (e.g., from a pressure tranducer). In additional and alternative aspects, the bulk modulus may be determined using strain measurements (e.g., from strain gauge 204). For example, the bulk modulus may be determined using the actuation points 402, 404, 406, 408 determined from the strain signal 400 of FIG. 4. The bulk modulus of fluid in the chamber 106 may be determined using a portion of the strain signal measured by the strain gauge 204 during times between two actuation points where both of the suction valve 116 and the discharge valve 118 are in a closed position. For example, the portion of the strain signal between actuation point 402 representing the closing of the suction valve 116 and actuation point 404 representing the opening of the discharge valve 118 may correspond to the strain in the chamber 106 over an amount of time when both the suction valve 116 and the discharge valve 118 are closed to isolate fluid in the chamber 106. As shown by the ramping up of the strain signal during the amount of time between the actuation points 402, 404 corresponds to a ramping up of the strain and pressure in the pump as the plunger 114 continues to move in the chamber during this time. Since the fluid is isolated in the chamber during this time, the movement of the plunger 114 may serve to temporarily compress or pressurize the fluid in the chamber 106 by displacing the fluid in the chamber 106 to cause a ramp up of the pressure.

Figure 5:
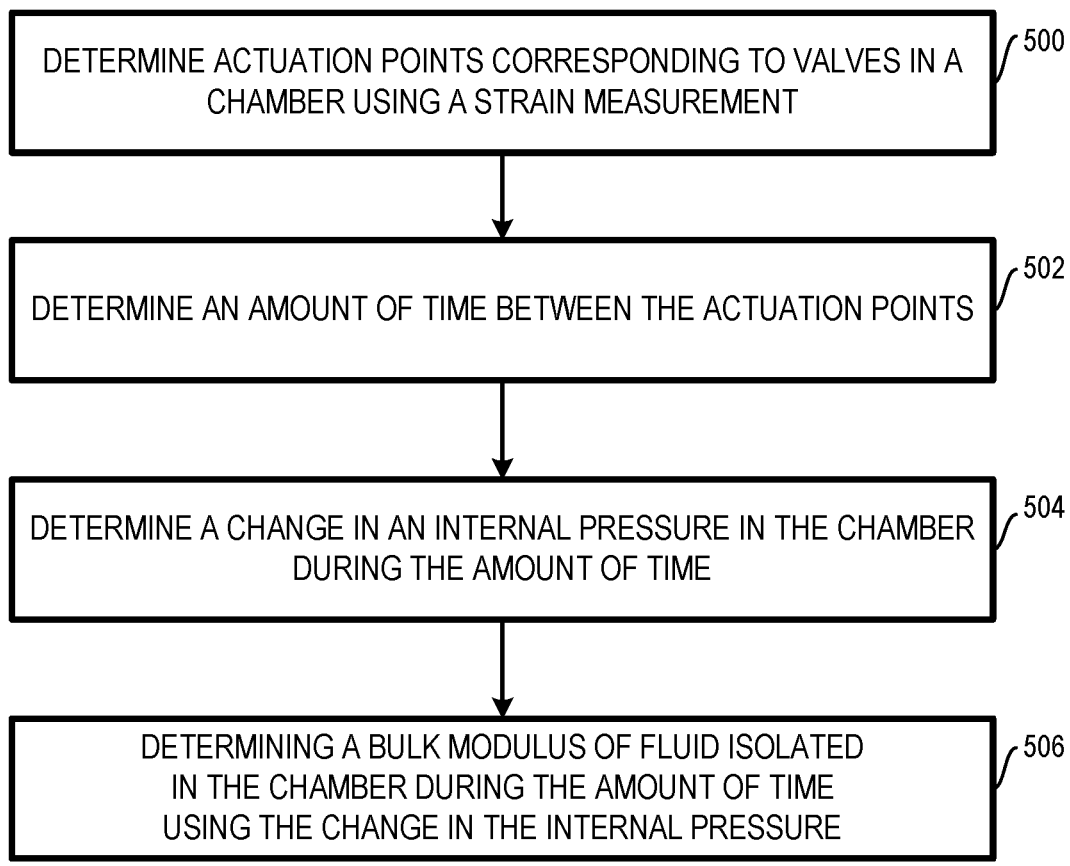
FIG. 5 is a flowchart describing an example of a process for determining a bulk modulus of a fluid system of the pressure pump according to one aspect of the present disclosure.

FIG. 5 is a flow chart showing an example of a process for determining the bulk modulus of the fluid when it the fluid isolated in the chamber 106 using the strain signal 400 of FIG. 4 according to some aspects of the present disclosure. The process is described with respect to the measurement system 200 shown in FIG. 2, although other implementations are possible without departing from the scope of the present disclosure.

In block 500, the computing device 210 determines the actuation points 402, 404 for the suction valve 116 and the discharge valve 118, respectively. In some aspects, the computing device 210 may determine actuation points 402, 404 based on the discontinuities in the strain signal 400 as described with respect to block 300 of FIG. 3. For illustrative purposes, the remaining steps in the process described in FIG. 5 are with respect to the actuation points 402, 404 of FIG. 4. But, in additional and alternative aspects, the computing device 210 may similarly determine actuation points 406, 408 representing the closing of the discharge valve 118 and the opening of the suction valve 116, respectively. In such aspects, the computing device 210 may continue the process of determining the bulk modulus of the fluid system of the pressure pump 100 as described herein based on the actuation points 406, 408 or other actuation points defining a boundary of an amount of time wherein both the suction valve 116 and the discharge valve 118 are closed to isolate the fluid in the chamber 106.

In block 502, the computing device 210 determines the amount of time between the actuation points 402, 404 for the suction valve 116 and the discharge valve. The amount of time between the actuation points 402, 404 may represent the amount of time that fluid is isolated in the chamber 106 in response to both the suction valve 116 and the discharge valve 118 being closed. The computing device 210 may determine the amount of time between the actuation points 402, 404 from the strain signal 400 by identifying the amount of time between the discontinuities of the strain signal 400 where the strain measured by the strain gauge 204 ramps up in response to the isolation of the fluid.

In block 504, the computing device 210 determines the change in internal pressure in the chamber during the amount of time between the actuation points 402, 404. In some aspects, the computing device 210 may correlate the strain in the chamber 106 with a known internal pressure to determine the change in internal pressure during the amount of time between the actuation points 402, 404. The known internal pressure may be previously determined based on engineering estimations, testing, experimentation, or calculations and previously stored as pump data 222 in the memory 214. For example, the known internal pressure may be estimated using finite element analysis. Finite element analysis may be performed to predict how the pressure pump 100 may respond or react to real-world forces. An operator may input or store pump properties concerning the pressure pump 100 and the fluid system properties concerning the fluid flowing through the pressure pump 100 in the memory 214 of the computing device as pump data 222. In some aspects, the computing device 210 may perform finite element analysis to generate a finite element model representing the pressure pump 100 based on the input pump data 222.

Figure 6:
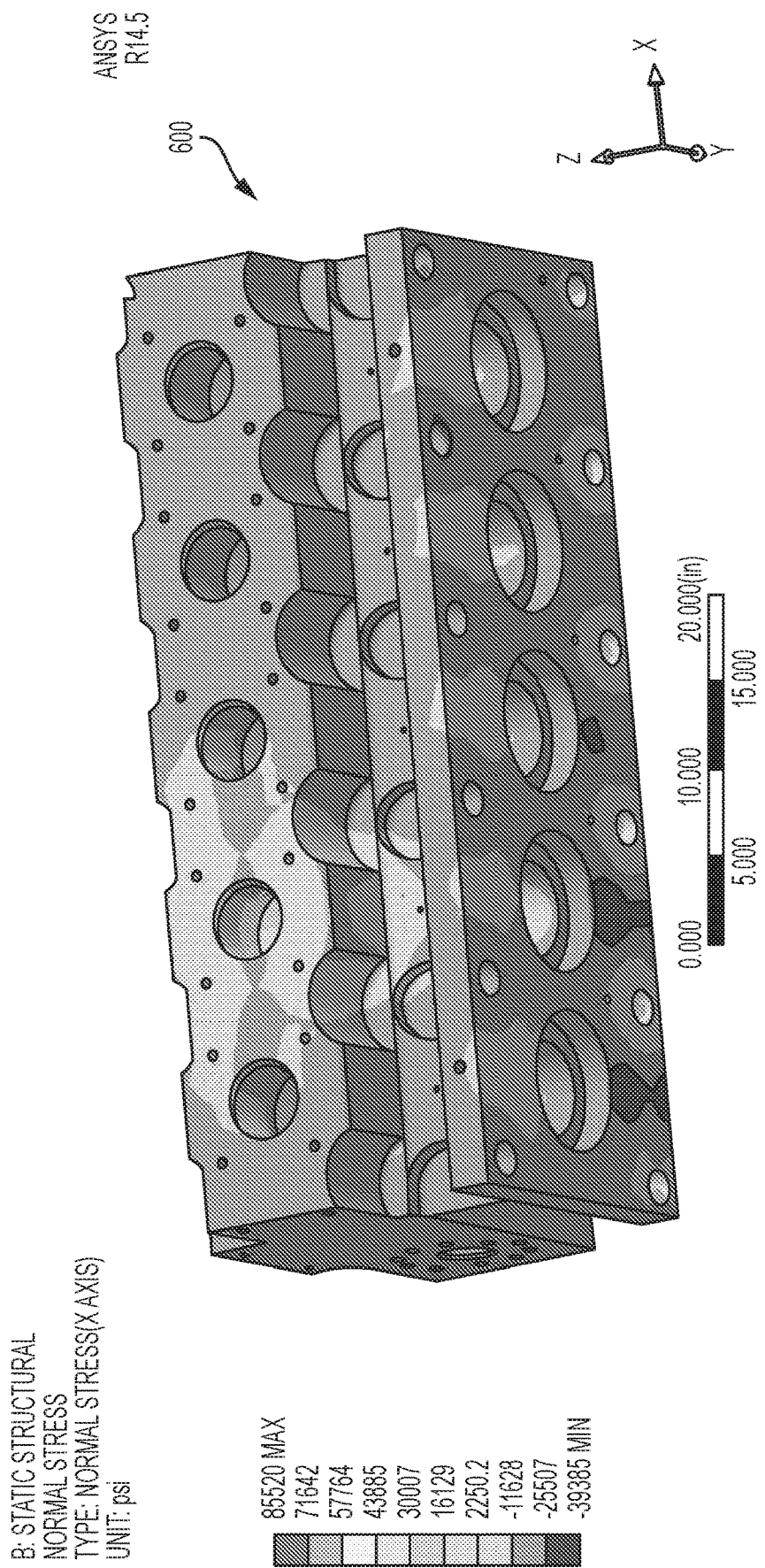
FIG. 6 is a finite element model that may be used to correlate the strain signal of FIG. 4 to internal pressure in a pressure pump according to one aspect of the present disclosure.

FIG. 6 shows an example of a finite element model 600 that may represent the pressure pump 100. The finite element model 600 may simulate the operation of the pressure pump 100 in the conditions derived from the pump properties and the fluid system properties input as pump data 222 to estimate the known internal pressure. The computing device 210 may determine the change in internal pressure during the amount of time between the actuation points 402, 404 by correlating the strain signal 400 during the amount of time between the actuation points 402, 404 (representing the change in strain in the chamber 106 during the amount of time between the actuation points 402, 404) with the determined measurement representing the known internal pressure.

Returning to block 504 of FIG. 5, in some aspects, the volume of fluid in the chamber 106 and the change of volume in the chamber during the amount of time between the actuation points 402, 404 may be known or previously determined values stored in the memory 214 as pump data 222 and used as input by the computing device 210 in executing the instructions 218 to determine the bulk modulus. In other aspects, the computing device 210 may determine the initial volume in the chamber 106 and the change in volume between the actuation points 402, 404 by correlating movement of the plunger 114 with the amount of time between the actuation points 402, 404 to identify the volume of fluid displaced by the plunger 114 in the chamber 106 during that time as described with respect to FIG. 6. The volume of the displaced fluid may correspond to a change in volume of the fluid for purposes of determining the bulk modulus of the fluid in the pressure pump 100. In some aspects, the position sensor 202 may generate position signals that may be used to determine the movement of the plunger for determining the change in volume.

Figure 7:
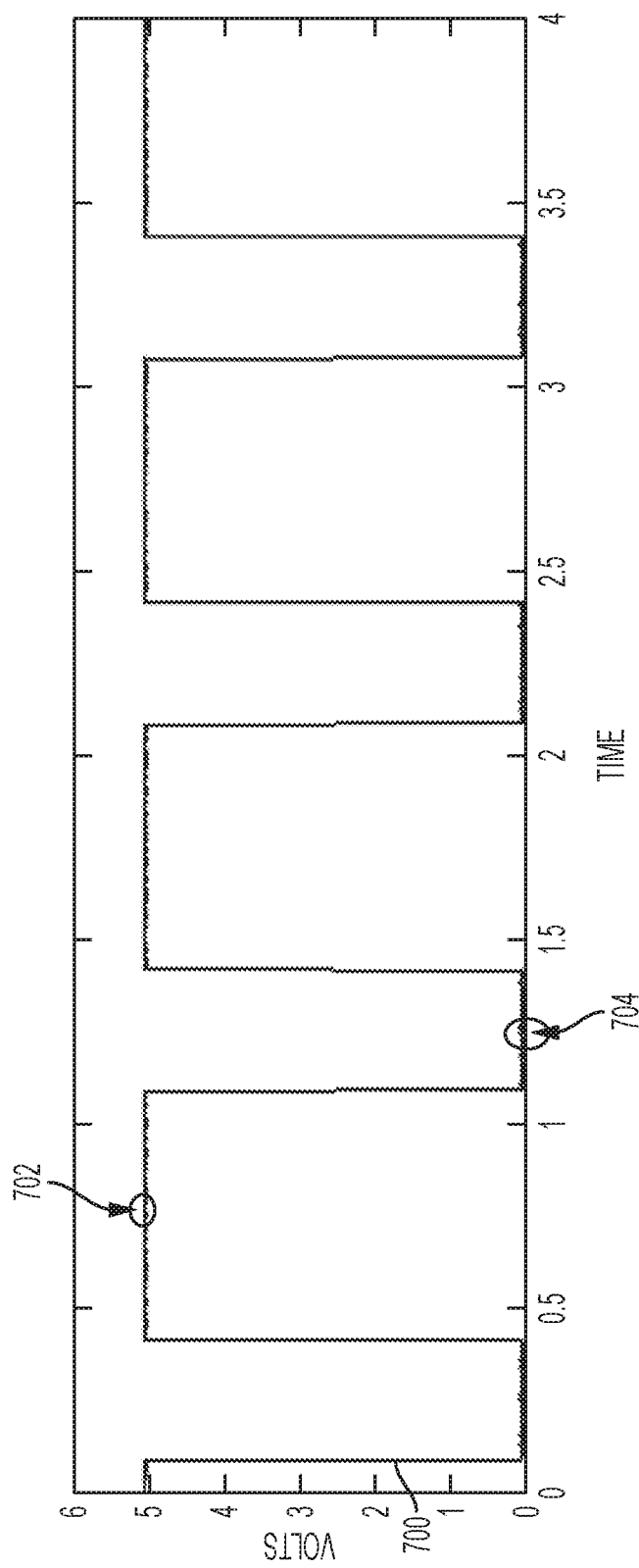
FIG. 7 is a signal graph depicting a signal generated by a position sensor of the measurement system of FIG. 2 according to one aspect of the present disclosure.
Figure 8:
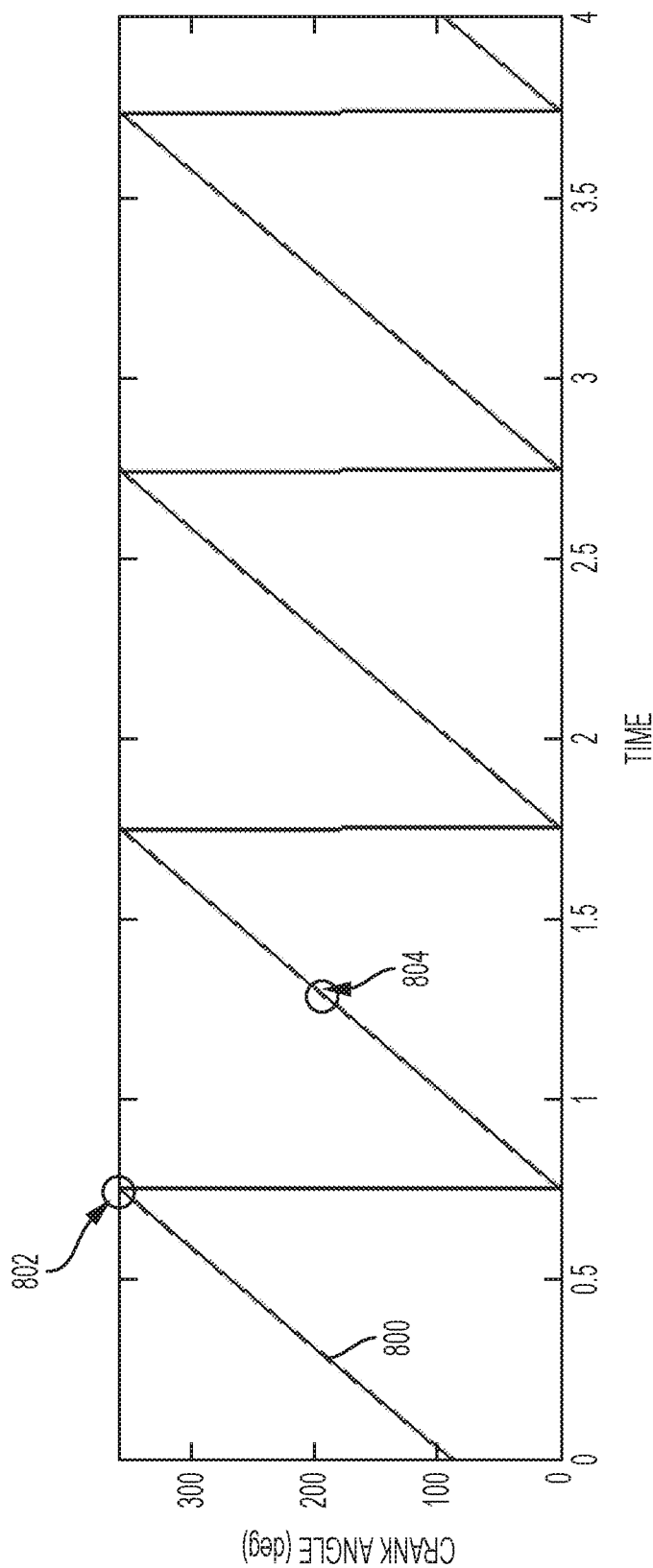
FIG. 8 is a signal graph depicting another signal generated by a position sensor of the measurement system of FIG. 2 according to one aspect of the present disclosure.

FIGS. 7 and 8 show position signals 700, 800 generated by the position sensor 202 during operation of the crankshaft 108. FIG. 7 shows a position signal 700 displayed in volts over time (in seconds). The position signal 700 may be generated by the position sensor 202 coupled to the power end 102 of the pressure pump 100 and positioned in a path of the crosshead 112. The position signal 700 may represent the position of the crankshaft 108 over the indicated time as the crankshaft 108 operates to cause the plunger 114 to move in the chamber 106. The mechanical coupling of the plunger 114 to the crankshaft 108 may allow the computing device 210 to determine a position of the plunger 114 relative to the position of the crankshaft 108 based on the position signal 700. In some aspects, the computing device 210 may determine plunger position reference points 702, 704, 802, 804 based on the position signal 700 generated by the position sensor 202. For example, the processor 212 may determine dead center positions of the plunger 114 based on the position signal 700. The dead center positions may include the position of the plunger 114 in which it is farthest from the crankshaft 108, known as the top dead center. The dead center positions may also include the position of the plunger 114 in which it is nearest to the crankshaft 108, known as the bottom dead center. The distance between the top dead center and the bottom dead center may represent the length of a full stroke of the plunger 114 operating in the chamber 106.

The top dead center is represented by reference point 702 and the bottom dead center is represented by reference point 704. In some aspects, the processor 212 may determine the reference points 702, 704 by correlating the position signal 700 with a known ratio or other expression or relationship value representing the relationship between the movement of the crankshaft 108 and the movement of the plunger 114 (e.g., the mechanical correlations of the crankshaft 108 to the plunger 114 based on the mechanical coupling of the crankshaft 108 to the plunger 114 in the pressure pump 100). The computing device 210 may determine the top dead center and bottom dead center based on the position signal 700 or may determine other plunger position reference points to determine the position of the plunger over the operation time of the pressure pump 100.

FIG. 8 shows a position signal 800 displayed in degrees over time (in seconds). The degree value may represent the rotational angle of the crankshaft 108 during operation of the crankshaft 108 or pressure pump 100. In some aspects, the position signal 800 may be generated by the position sensor 202 located directly on the power end 102. The position sensor 202 may generate the position signal 800 based on the bolt pattern of the crankshaft 108 as it rotates in response to the rotation of the crankshaft 108 during operation. Similar to the position signal 700 shown in FIG. 7, the computing device 210 may determine plunger position reference points 702, 704, 802, 804 based on the position signal 800. The reference points 802, 804 in FIG. 8 represent the top dead center and bottom dead center of the plunger 114 for the chamber 106 during operation of the pressure pump 100.

Figure 9:
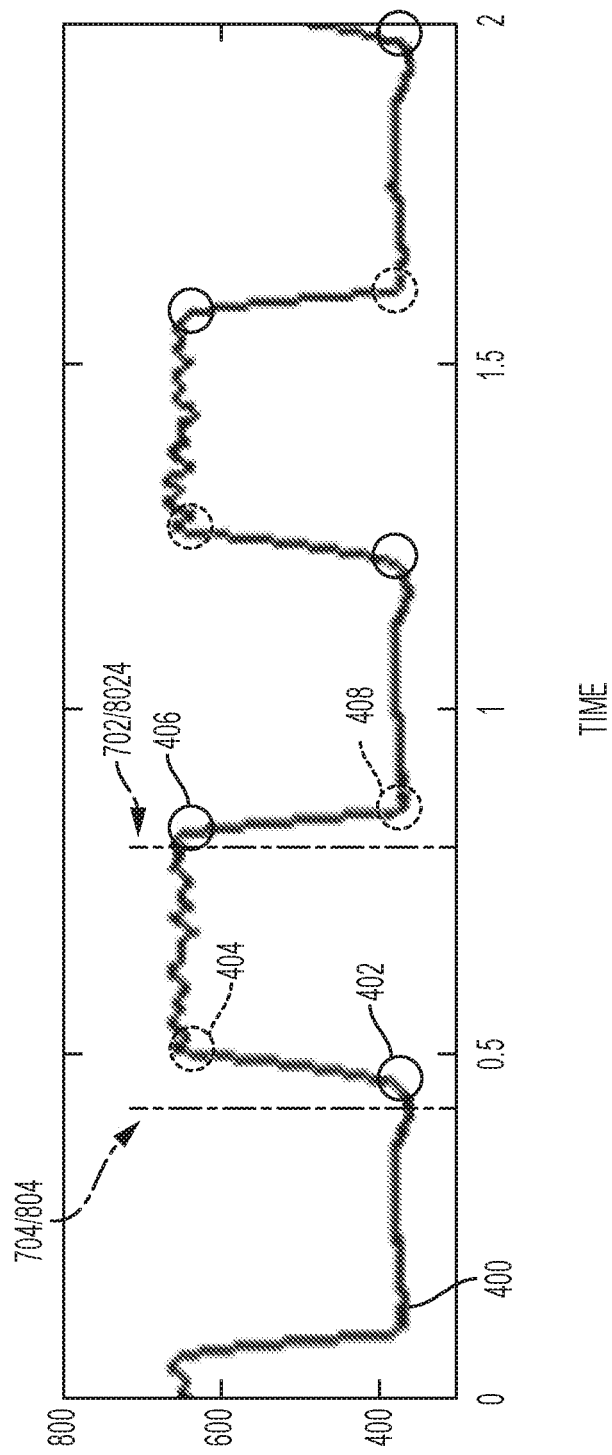
FIG. 9 is a signal graph depicting actuation of a suction valve and a discharge valve relative to the strain signal of FIG. 4 and a plunger position according to one aspect of the present disclosure.

The actuation points 402, 404, 406, 408 may be cross-referenced with the position signals 700, 800 to determine the position and movement of the plunger 114 in reference to the actuation of the suction valve 116 and the discharge valve 118. FIG. 9 shows the actuation of the suction valve 116 and the discharge valve 118 relative to the plunger position reference points 702, 704, 802, 804. The amount of time between the actuation points 402, 404, 406, 408 and the plunger position reference points 702, 704, 802, 804 may represent delays in the actuation (e.g., opening and closing)

of the suction valve 116 and the discharge valve 118 that may temporarily isolate the fluid when both the suction valve 116 and the discharge valve are closed.

Referring back to FIG. 5, in block 506, the computing device 210 may determine the bulk modulus of the fluid isolated in the chamber 106 during the amount of time between the actuation points 402, 404. In some aspects, the processor 212 may execute instructions 218 to cause the computing device 210 to determine the bulk modulus of the fluid in the chamber 106 by determining the effective bulk modulus associated with components of the chamber 106. For example, the instructions 218 may also include the following equation for determining bulk modulus:

$$\beta_e = -\Delta P \frac{V_o}{\Delta V}$$

where $\beta_e$ is the effective bulk modulus of the fluid in the pressure pump 100 in psi, $\Delta P$ is the change in pressure in psi, $V_o$ is an initial volume of fluid, and $\Delta V$ is a change in the volume of fluid. The units of measurement for volume may not be significant to the equation as long as units associated with input values are consistent. The instructions 218 may also include the following equation for determining effective bulk modulus, representing the bulk modulus of each of the components of the pressure pump 100 associated with the chamber 106:

$$\frac{1}{\beta_e} = \frac{1}{\beta_1} + \frac{1}{\beta_2} + \frac{1}{\beta_3}\ldots$$

where $\beta_e$ is the effective bulk modulus in psi and the other terms ($\beta_1$, $\beta_2$, $\beta_3$, etc.) represent the additional components that affect the effective bulk modulus. The bulk modulus of the fluid system may be determined using the effective bulk modulus. For example, the instructions 218 may also include the following equation for determining the bulk modulus of the fluid system components:

$$\frac{1}{\beta_{fluid}} = \frac{1}{\beta_e} - \frac{1}{\beta_{mechanical}}$$

where $\beta_{fluid}$ is the bulk modulus of the fluid system in psi, $\beta_e$ is the effective bulk modulus in psi, and $\beta_{mechanical}$ is the bulk modulus of the additional, non-fluid components associated with the chamber 106.

Figure 10:
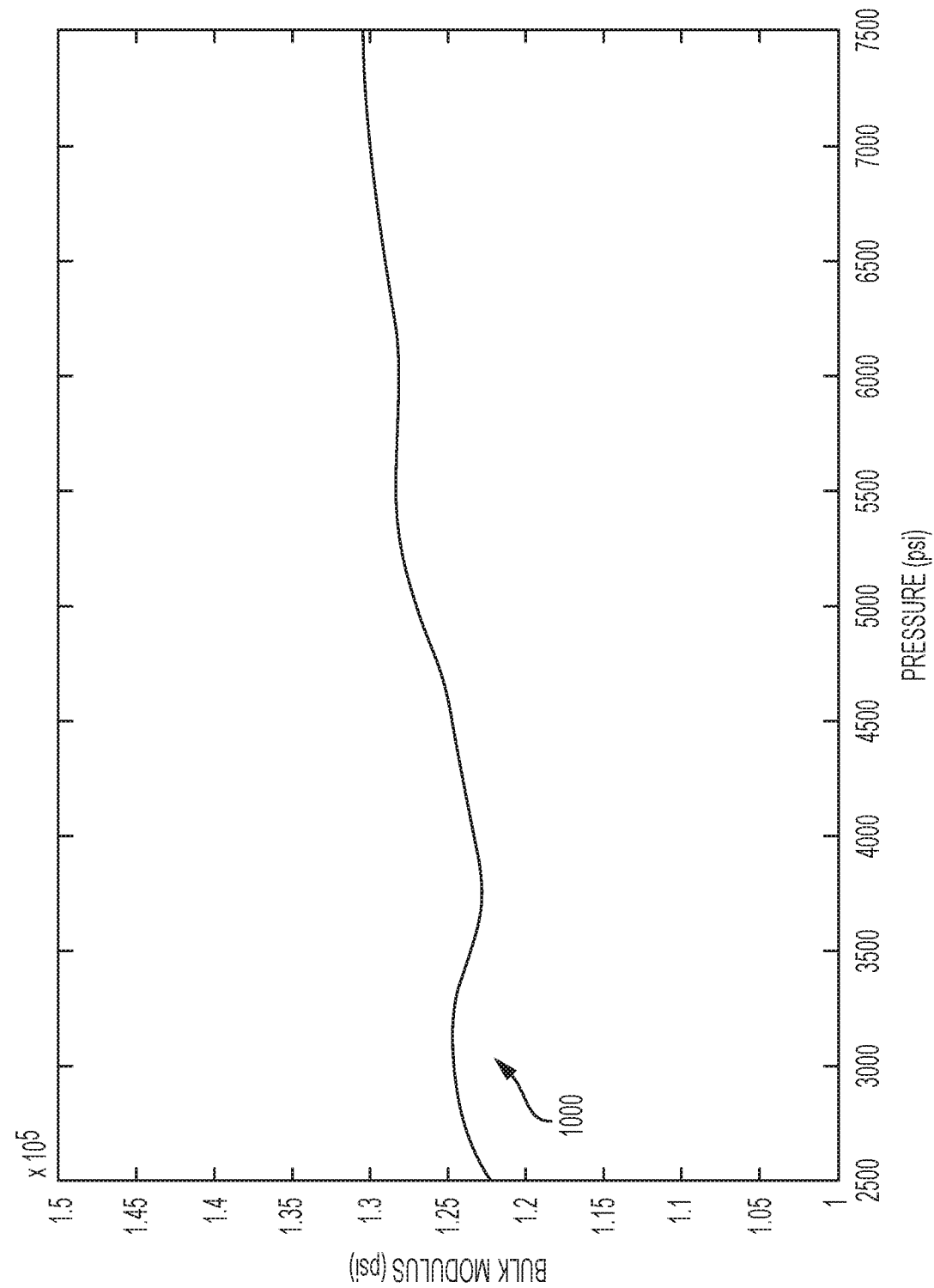
FIG. 10 is a signal graph depicting an example of a bulk modulus reading generated by the measurement system of FIG. 2 according to one aspect of the present disclosure.

The effective bulk modulus may include the effects of the pressure pump 100 and components of the pressure pump 100 (e.g., packing, valve inserts, etc.) in addition to the fluid system. FIG. 10 shows an effective bulk modulus reading 1000 that may be generated by the computing device 210. The bulk modulus may be determined by the computing device 210 during the amount of time between the actuation points 402, 404. Accordingly, the bulk modulus reading 1000 may include a continuous curve of bulk modulus ranging from the inlet pressure corresponding to the suction side of the pressure pump 100 (and the suction valve 116 of the chamber 106) to the outlet pressure corresponding to the discharge side of the pressure pump 100 (and the discharge valve 118 of the chamber 106). In some aspects, the continuous curve of bulk modulus may be extrapolated further to determine the bulk modulus of the fluid system at various pressures, including downhole conditions of the wellbore 224 to accurately conduct displacements (e.g., cement, ball drops, etc.).

Returning to FIG. 3, in block 304, the computing device 210 receives pulse measurements corresponding to a speed of a pulse through the fluid in the pressure pump 100. For example, the computing device 210 may receive timing signals from the pulse generator 206 and the pulse detector 208. The timing signal received from the pulse generator 206 may correspond to a time that a pulse is generated by the pulse generator 206. The timing signal received from the pulse detector 208 may correspond to a time that the same pulse is received, or otherwise sensed, by the pulse detector 208. In some aspects, the pulse generator 206 and the pulse detector 208 may be positioned in the chamber 106 of the pressure pump 100. In other aspects, the pulse generator 206 and the pulse detector 208 may be placed in another location of the fluid end 104 of the pressure pump system (e.g., the inlet manifold 120, the discharge manifold 122, a manifold line connected to the pressure pump 100).

In additional and alternative aspects, a pulse detection system may include at least two pulse generators 206 and two pulse detectors 208. The computing device 210 may receive timing signals from each pulse generator 206 and each pulse detector 208 in the pulse detection system. For example, a first pair including one pulse generator 206 and one pulse detector 208 may be positioned to cause the pulse to be transmitted from the pulse generator 206 to the pulse detector 208 in a first direction through the fluid. A second pair including a second pulse generator 206 and a second pulse detector 208 may be positioned to cause the pulse to be transmitted from the pulse generator 206 to the pulse detector 208 in a second direction through the fluid that is opposing the first direction. In this example, the computing device 210 may use the timing signals from both the first pair and the second pair to offset distortions to the measurements using the timing signals caused by the motion of the fluid in the pressure pump 100 while the pulses from each pair traverse the fluid.

In block 306, a speed of sound through the fluid is determined using the pulse measurement received in block 302. In some aspects, the computing device 210 may use the timing signals received from the pulse generator 206 and the pulse detector 208 to determine an amount of time that the pulse traveled from the pulse generator 206 to the pulse detector 208. For example, the computing device 210 may subtract the time represented by the timing signal generated by the pulse generator 206 from the time represented by the timing signal generated by the pulse detector 208 to determine an amount of time that the pulse traversed the fluid from the pulse generator 206 to the pulse detector 208. The distance between the pulse generator 206 and the pulse detector 208 may be retrieved from the pump data 222 and used with the time determined by the computing device 210 to determine the speed of sound. The processor 212 of the computing device 210 may execute instructions 218 to cause the computing device 210 to determine a speed of sound through the fluid by determining the speed of the pulse through the fluid. For example, the instructions 218 may also include the following equation for determining the speed of sound through the fluid system in the pressure pump 100:

$$S_S = d/t$$

where d is a distance of sound travelled through the fluid system of the pressure pump 100 in inches and t is the time taken for the sound to travel through the fluid system in the pressure pump 100 in seconds.

In some aspects, the speed of the pulse through the fluid may correspond to the speed of sound through the fluid. In additional aspects, the processor 212 may similarly determine the speed of a second pulse through the fluid. The second pulse may be generated by a second pulse generator 206 and detected by a second pulse detector 208. The processor 212 may divide the distance traversed by the second pulse by the travel time of the second pulse through the fluid. The speed of the first pulse and the speed of the second pulse may be averaged to determine the speed of sound through the fluid. In some aspects, the averaging of the speeds of multiple pulses may offset motion of the fluid in the pressure pump while the pulses are traversing the fluid.

In block 308, a fluid density of the fluid in the pressure pump is determined according to some aspects of the pressure disclosure. For example, the instructions 218 can include the following general equation for determining the density of a fluid system:

$$\rho_{fluid} = \beta_{fluid}/S_S^2$$

where $\rho_{fluid}$ is the density of a fluid system in the pressure pump 100 in pounds per cubic inch, $\beta_{fluid}$ is the bulk modulus of the fluid system in psi (pounds per square inch), and $S_S$ is the speed of sound through the fluid system in the pressure pump 100 in inches per second. Although specific units are described, the system of measurements may not be significant to the relationship between the measurements as long as the associated units have consistent values, some requiring additional constants. Since the bulk modulus is determined as a continuous curve of bulk modulus ranging from the inlet pressure corresponding to the suction side of the pressure pump 100 to the outlet pressure corresponding to the discharge side of the pressure pump 100, the fluid density of the fluid system of the pressure pump 100 may also be determined along the same range of pressure.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system, comprising:
  a strain gauge positionable on a fluid end of a pressure pump to measure strain in a chamber of the pressure pump and generate a strain signal representing the strain in the chamber;
  a pulse detection system including one or more pulse generators and one or more pulse detectors, the pulse detection system being positionable on the fluid end of the pressure pump to generate timing signals useable to determine a travel time of a corresponding pulse traversing fluid, wherein the strain signal and the timing signals are useable to determine a density of the fluid.

2. The system of claim 1, further comprising a computing device communicatively coupled to the strain gauge and the pulse detection system to determine the density of the pressure pump, the computing device including a processing device for which instructions executable by the processing device are useable to cause the processing device to:
  determine a bulk modulus of the fluid isolated in the chamber of the pressure pump using the strain signal;
  determine a speed of sound through the fluid using the timing signals; and
  determine the density of the fluid in the pressure pump by dividing the bulk modulus by a square of the speed of sound.

3. The system of claim 2, wherein the instructions are executable by the processing device for causing the processing device to determine the bulk modulus of the fluid by:
  determining actuation points for valves in the chamber by identifying discontinuities in the strain signal, the actuation points including a first point corresponding to a closing time of a first valve in the chamber and a second point corresponding to an opening time of a second valve in the chamber;
  determining an amount of time between the actuation points;
  determining a pressure change in internal pressure in the chamber during the amount of time between the actuation points; and
  determining a fluid volume in the chamber at the first point; and
  determining a volume change in the fluid volume in the chamber during the amount of time between the actuation points.

4. The system of claim 3, wherein the instructions are executable by the processing device for causing the processing device to determine the pressure change in the internal pressure by correlating a portion of the strain signal between the actuation points with a predetermined internal pressure in the chamber.

5. The system of claim 3, wherein the instructions are executable by the processing device for causing the processing device to determine an effective bulk modulus of the fluid using the pressure change in the chamber during the amount of time between the actuation points, the fluid volume in the chamber at the first point, and the volume change in the chamber during the amount of time between the actuation points, and
  wherein the effective bulk modulus includes the bulk modulus of the fluid and a mechanical bulk modulus of non-fluid components of the pressure pump.

6. The system of claim 3, further comprising a position sensor positionable on a power end of the pressure pump to sense a position of a rotating member of a rotating assembly of the pressure pump that is mechanically coupled to a displacement member corresponding to the chamber and generate a position signal representing the position of the rotating member during operation of the pressure pump,
  wherein the instructions are executable by the processing device for causing the processing device to:
    determine a movement of the displacement member in the chamber by correlating the position of the rotating member with an expression representing a mechanical correlation of the displacement member to the rotating member; and
    determine the volume change in the fluid volume using a volume of the fluid in the chamber that is displaced by the movement of the displacement member during the amount of time between the actuation points.

7. The system of claim 2, wherein a pulse generator of the one or more pulse generators is positionable in the fluid end of the pressure pump to generate the corresponding pulse that is detectable by a pulse detector of the one or more pulse detectors subsequent to traversing the fluid, wherein the timing signals include a first timing signal generated by the pulse generator and representing a transmission time that the corresponding pulse was transmitted through the fluid and a second timing signal generated by the pulse detector and representing a detection time that the corresponding pulse was detected by the pulse detector, wherein the instructions are executable by the processing device for causing the processing device to determine a pulse speed of the corresponding pulse by using the timing signals to determine the travel time of the corresponding pulse and dividing a distance between the pulse generator and the pulse detector by the travel time, the pulse speed of the corresponding pulse corresponding to the speed of sound through the fluid.

8. The system of claim 2, wherein the pulse detection system comprises a first subsystem including a first pulse generator and a first pulse detector and a second subsystem including a second pulse generator and a second pulse detector, the first subsystem being useable to generate first timing signals corresponding to a first pulse traversing the fluid in a first direction, the second subsystem being useable to generate second timing signals corresponding to a second pulse traversing the fluid in an opposing direction, wherein the instructions are executable by the processing device for causing the processing device to determine the speed of sound through the fluid by averaging a first pulse speed corresponding to the first pulse and a second pulse speed corresponding to the second pulse.

9. A pumping system, comprising:
a pressure pump including a chamber having a first valve actuatable to a closed position at a first actuation point and a second valve actuatable to an open position at a second actuation point, an amount of time between the first actuation point and the second actuation point being detectable by a strain gauge; and
a computing device communicatively couplable to the pressure pump to determine a density of fluid using a bulk modulus measurement of the fluid isolated in the chamber during the amount of time between the first actuation point and the second actuation point and a speed of sound through the fluid, the speed of sound corresponding to a pulse speed that is detectable using a pulse detection system including a pulse generator and a pulse detector positionable in a fluid end of the pressure pump.

10. The pumping system of claim 9, wherein the computing device comprises a processing device for which instructions executable by the processing device are useable to cause the processing device to determine the first actuation point and the second actuation point by identifying discontinuities in a strain signal received from the strain gauge and representing strain in the chamber.

11. The pumping system of claim 9, wherein the computing device comprises a processing device for which instructions executable by the processing device are useable to cause the processing device to determine the bulk modulus measurement by:
determining a pressure change in internal pressure in the chamber during the amount of time between the first actuation point and the second actuation point;
determining a fluid volume in the chamber at the first actuation point; and
determining a volume change in the fluid volume in the chamber during the amount of time between the first actuation point and the second actuation point.

12. The pumping system of claim 11, wherein the instructions are executable by the processing device to cause the processing device to receive a strain signal from the strain gauge representing strain in the chamber and determine the pressure change in the internal pressure in the chamber during the amount of time between the first actuation point and the second actuation point by correlating a portion of the strain signal between the first actuation point and the second actuation point with the internal pressure in the chamber.

13. The pumping system of claim 11, wherein the instructions are executable by the processing device to cause the processing device to determine an effective bulk modulus of the fluid using the pressure change in the internal pressure in the chamber during the amount of time between the first actuation point and the second actuation point, the fluid volume in the chamber at the first actuation point, and the volume change in the fluid volume in the chamber during the amount of time between the first actuation point and the second actuation point, and
wherein the effective bulk modulus includes the bulk modulus measurement of the fluid and a mechanical bulk modulus measurement of non-fluid components of the pressure pump.

14. The pumping system of claim 11, wherein the instructions are executable by the processing device to cause the processing device to determine the volume change in the fluid volume in the chamber by:
receiving a position signal from a position sensor positionable on a power end of the pressure pump, the position signal corresponding to a position of a rotating member of the pressure pump that is mechanically coupled to a displacement member corresponding to the chamber;
determining a movement of the displacement member in the chamber by correlating the position of the rotating member with an expression representing a mechanical correlation of the displacement member to the rotating member; and
determining a volume of the fluid in the chamber that is displaced by the movement of the displacement member during the amount of time between the first actuation point and the second actuation point.

15. The pumping system of claim 9, wherein the computing device comprises a processing device for which instructions executable by the processing device are useable to cause the processing device to determine the speed of sound through the fluid by:
receiving a first timing signal generated by the pulse generator and representing a transmission time that a pulse was transmitted through the fluid;
receiving a second timing signal generated by the pulse detector and representing a detection time that the pulse was detected by the detector;
determining a travel time corresponding to a time interval between the transmission time and the detection time; and
dividing a distance between the pulse generator and the pulse detector by the travel time to identify the pulse speed.

16. The pumping system of claim 9, wherein the computing device comprises a processing device for which instructions executable by the processing device are useable to cause the processing device to determine the speed of sound through the fluid by:

receiving a first set of timing signals from the pulse generator and the pulse detector corresponding to a first pulse traversing the fluid of the pressure pump in a first direction;

receiving a second set of timing signals from a second pulse generator and a second pulse detector corresponding to a second pulse traversing the fluid of the pressure pump in a second direction that is opposite the first direction;

determining a first pulse speed corresponding to the first pulse and a second pulse speed corresponding to the second pulse; and averaging the first pulse speed and the second pulse speed.

17. A method, comprising:

determining, by a processing device, a bulk modulus of fluid isolated in a chamber of a pressure pump;

determining, by the processing device, a speed of sound through the fluid using a pulse speed for a first pulse traversing the fluid; and determining, by the processing device, a density of the fluid using the bulk modulus and the speed of sound.

18. The method of claim 17, further comprising:

receiving, from a stain gauge positioned on the pressure pump, a strain signal corresponding to strain in the chamber;

wherein the bulk modulus is determined using the strain signal, wherein determining the density of the fluid includes dividing the bulk modulus of the fluid by a square of the speed of sound.

19. The method of claim 18, wherein determining the bulk modulus of the fluid includes:

determining actuation points corresponding to valves in the chamber of the pressure pump by identifying discontinuities in the strain signal, the actuation points being associated with a closing time of a first valve of the chamber and an opening time of a second valve of the chamber;

determining an amount of time between the actuation points;

determining a change in an internal pressure in the chamber during the amount of time between the actuation points; and determining an initial volume of the fluid isolated in the chamber at the closing time of the first valve and a change in volume of the fluid during the amount of time between the actuation points.

20. The method of claim 17, wherein determining the speed of sound through the fluid includes:

determining, using the timing signals received from a first pulse generator and a first pulse detector, the pulse speed for the first pulse traversing the fluid in a first direction;

determining, using additional timing signals received from a second pulse generator and a second pulse detector, a second pulse speed for a second pulse traversing the fluid in a second direction that is opposite the first direction; and averaging the pulse speed and the second pulse speed.

* * * * *